Patented Apr. 25, 1950

2,505,497

UNITED STATES PATENT OFFICE 2,505,497

PRODUCTION OF PHOTOGRAPHIC SENSITIZING DYESTUFFS

John David Kendall and Frank Peter Doyle, Ilford, England, assignors to Ilford Limited, Ilford, England, a British company No Drawing. Application July 1, 1946, Serial No. 680,826. In Great Britain July 3, 1945

4 Claims. (Cl. 260—240)

This invention relates to the production of cyanine dyestuffs and to the sensitising of photographic silver halide emulsions therewith.

In co-pending application No. 680,824 filed on even date herewith, now Patent No. 2,465,883, granted March 29, 1949, processes are described for the production of dyestuff intermediates of the formula:

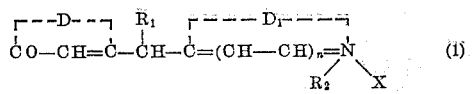 (1)

which is tautomeric with

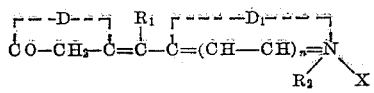

where $R_1$ is a hydrogen atom or a hydrocarbon group, $R_2$ is an alkyl or aralkyl group, D is a chain of three methylene groups any of which may be hydrocarbon-substituted, $D_1$ is a residue of a five-membered or six-membered heterocyclic nitrogen nucleus, X is an acid radicle and $n$ is nought or one.

In copending U. S. application Serial No. 680,824, filed July 1, 1946 there are described processes for the preparation of compounds of the general formula:

 (7)

where R is an alkyl or an aralkyl group and D is a chain of three methylene groups, any of which may be hydrocarbon-substituted. Such compounds may be defined as Δ2:3-[3-alkyl (or aralkyl) thio] cyclohexenone (1) compounds. The monothio ether compounds of the above Formula 7 are made as described in aforesaid application Serial No. 680,822, now Patent No. 2,465,882, granted March 29, 1949, by reacting a cyclic 1,3-diketone of the general formula:

 (8)

wherein D has the same significance as in Formula 7 with an alkyl, aryl, or aralkyl mercaptan (RSH) in the presence of a strong acid, e. g., dry hydrochloric acid, nitric acid, sulphuric acid, phosphoric acid, or strong organic acids, e. g., p-toluene sulphonic acids.

In carrying out the action one molecular equivalent of the cyclic ketone is treated with preferably not less than two molecular equivalents of mercaptan; a considerable excess of mercaptan may be present and function as a solvent. The quantity of the strong acid is not critical, but generally at least one molecular equivalent of a dibasic acid or at least two molecular equivalents of a monobasic acid may be employed.

It is preferred to keep the reaction mixture as dry as possible. A solvent for the reactants may be present, e. g., benzene, toluene or a lower alcohol, or an ether, for example, diethyl ether. The reaction proceeds at normal room temperature and there is no necessity to heat the reaction mixture.

The dyestuff intermediates of Formula 1 are produced upon heating a compound of general Formula 7 with an alkyl or aralkyl quaternary salt of a 5-membered or 6-membered heterocyclic nitrogen compound containing a reactive methylene group in the alpha or gamma position to the quaternary nitrogen atom. The reaction proceeds in accordance with the following equation:

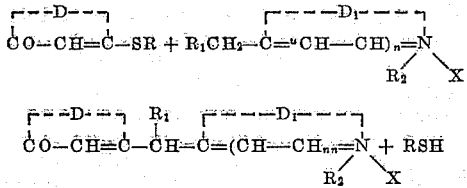

which is tautomeric with

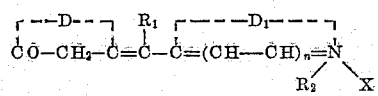

According to the present invention a dyestuff intermediate of the type indicated in formula (1) above in which $D_1$ is the residue of a heterocyclic nitrogen ring selected from the class consisting of thiazole, selenazole and their polycyclic homologues, thiazole, selenazole and their polycyclic homologues, thiazoline, selenazoline, diazines and diazoles is reacted with a compound of the formula:

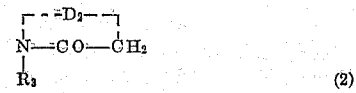 (2)

where $D_2$ is the residue of a five-membered heterocyclic nitrogen keto-methylene compound and $R_3$ is hydrogen or a hydrocarbon atom, the reaction being effected in the presence of a base.

The polycyclic homologues referred to above may also be substituted in the carbocyclic rings with one or more groups such as alkyl, aryl, amino, hydroxy, alkoxy and methylene-dioxy groups or by halogen atoms.

$D_2$ may be the residue of a heterocyclic nitrogen keto-methylene compound such as rhodanic acid and its N-hydrocarbon-substituted derivatives, oxindoles, pyrazole-5-ones, hydantoin, pseudohydantoin, thiohydantoin and pseudothiohydantoin.

The formation of the dyestuffs is preferably effected by heating the reagents together in the presence of a solvent and a strong base, e. g. triethylamine or an inorganic base such as a solution of sodium or sodium acetate in ethyl alcohol.

Where the dyestuff is obtained in the form of a sulphate or an alkyl-p-toluene sulphonate, it may be converted to a salt of another acid by treatment with a solution of an alkali salt of such other acid, e. g. potassium chloride, potassium bromide, potassium iodide and potassium perchlorate.

According to a further feature of the invention, when the five-membered ring compound Formula 2 which is condensed with the said dyestuff intermediate corresponds to the general formula:

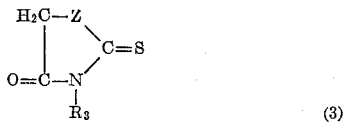

(Z being an oxygen atom or a sulphur atom) the resulting product contains a thione grouping and so may be treated with an alkyl or aralkyl ester and condensed with a compound of the type of Formula 2, i. e. the process of the invention may be repeated to add a further group to the product.

When this second condensation is with a five-membered ring compound of the formula of Formula 2 which also corresponds to the formula of Formula 3, the product will once more contain a thione grouping, and by proceeding in this way the condensation may be repeated as often as desired. The first or final product containing a thione grouping may be condensed with an alkyl or aralkyl ester and then with the alkyl or aralkyl quaternary salt of any five-membered or six-membered heterocyclic nitrogen compound containing a reactive methylene or imino group in $\alpha$ or $\tau$ position to the quaternary nitrogen atom. The heterocyclic nitrogen compound may be, for example, any of those listed in connection with $D_1$.

The following examples will serve to illustrate the invention, but are not to be regarded as limiting it in any way. The parts are by weight.

*Example 1*

Preparation of the dyestuff of the formula:

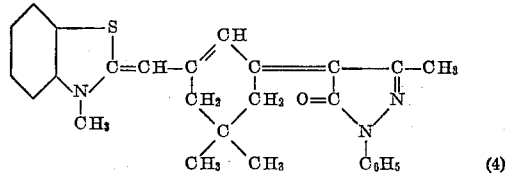

4.9 parts of 5.5-dimethyl-3($\alpha$-methenyl benzthiazole methyl p-toluene sulphonate) cyclohexanone (1), 1.74 parts of 1-phenyl-3-methyl-5-pyrazolone and 10 parts of pyridine were heated to boiling and 2.5 parts of triethylamine were added. The solution, after 30 minutes' refluxing was a deep blue-purple colour. It was poured into water, acidified with glacial acetic acid, filtered and the precipitate washed with water. This was recrystallised from ethyl alcohol to give the dyestuff as dark bronze-green crystals, M. Pt. 243° C. (with decomposition).

*Example 2*

Preparation of the dyestuff of the formula:

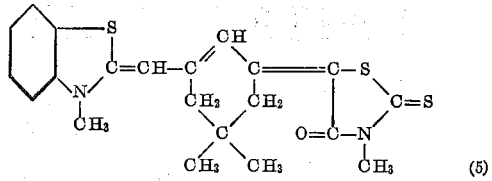

4.9 parts of 5.5-dimethyl-3($\alpha$-methenyl benzthiazole methyl p-toluene sulphonate) cyclohexanone (1), 1.47 parts of N-methyl rhodanic acid and 80 parts of ethyl alcohol were warmed together and 2.5 parts of triethylamine were added. The solution was boiled for one hour and cooled, when the dyestuff crystallised out. It was removed by filtration and washed with ethyl alcohol and ether. It was purified by boiling out with methyl alcohol, when it was obtained as matted emerald green crystals, M. Pt. 227° C.

The dyestuffs produced by the process of this invention are valuable sensitisers for silver halide photographic emulsions. For example, the dyestuff of Example 1 included in a gelatino silver iodobromide emulsion sensitises with a maximum at 6300 Å.

Accordingly it is a further and important feature of this invention that improved silver halide photographic emulsions are provided which include, in sensitising amount, the dyestuffs producible by the process of this invention. These include compounds of the general formula:

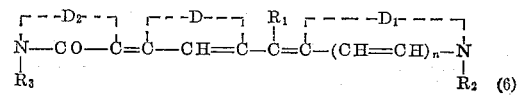

where the various symbols have the meanings assigned to them above.

What we claim is:

1. Process for the production of dyestuffs which comprises reacting together (a) a dyestuff intermediate of the general formula:

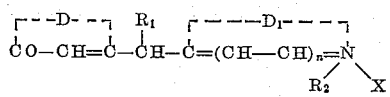

where $R_1$ is selected from the class consisting of the hydrogen atom and hydrocarbon groups, $R_2$ is selected from the class consisting of alkyl and aralkyl groups, X is an acid radicle, $n$ is nought or one, $D_1$ is the residue of a thiazole nucleus, and D is a chain of three methylene groups any of which may be hydrocarbon-substituted and (b) a compound of the general formula:

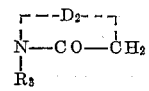

where $D_2$ is the residue of a five-membered heterocyclic keto-methylene compound taken from the group consisting of a pyrazolone and a rhodanic acid compound and $R_3$ is selected from the class consisting of the hydrogen atom and hydrocarbon groups, the reaction being effected by heating the reactants together in the presence of a base.

2. A process according to claim 1 wherein X is a paratoluene sulphonate radicle.

3. A process according to claim 1 wherein the reaction is effected in the presence of a solvent for the reactants.

4. Dyestuffs of the general formula:

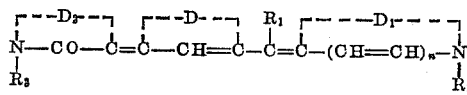

where $R_1$ and $R_3$ are each selected from the class consisting of the hydrogen atom and hydrocarbon groups, $R_2$ is selected from the class consisting of alkyl and aralkyl groups, $n$ is nought or one, $D_1$ is the residue of a thiazole nucleus, $D_2$ is the residue of a five-membered heterocyclic keto-methylene compound taken from the group consisting of a pyrazolone and a rhodanic acid compound and D is a chain of three methylene groups any of which may be hydrocarbon-substituted.

JOHN DAVID KENDALL.
FRANK PETER DOYLE.

REFERENCES CITED

The following references are of record in the file of this patent:

UNITED STATES PATENTS

| Number | Name | Date |
|---|---|---|
| 2,138,225 | Williams | Nov. 29, 1938 |
| 2,166,736 | White et al. | July 18, 1939 |
| 2,263,749 | White et al. | Nov. 25, 1941 |
| 2,265,909 | Kendall | Dec. 9, 1941 |
| 2,322,015 | Hamer et al. | June 15, 1943 |
| 2,340,882 | Kendall | Feb. 8, 1944 |
| 2,342,546 | Kendall | Feb. 22, 1944 |
| 2,353,164 | Kendall et al. | July 11, 1944 |

OTHER REFERENCES

Chemical Abstracts 16:3101 (Abstract of Brit. Med. Journal, 1922, I, 514–515).

Chemical Abstracts 19:530 (Abstract of Proc. Roy. Soc., London, 96B, 317–333, 1924).